(12) United States Patent
Tsuchizawa et al.

(10) Patent No.: US 9,944,348 B2
(45) Date of Patent: Apr. 17, 2018

(54) BICYCLE CONTROL APPARATUS FOR BICYCLE ASSIST DEVICE AND BICYCLE ASSIST DEVICE

(71) Applicant: Shimano Inc., Sakai, Osaka (JP)

(72) Inventors: Yasuhiro Tsuchizawa, Osaka (JP); Shinichiro Noda, Osaka (JP); Satoshi Shahana, Osaka (JP); Makoto Usui, Osaka (JP); Yuki Kataoka, Osaka (JP)

(73) Assignee: Shimano Inc., Osaka (JP)

( * ) Notice: Subject to any disclaimer, the term of this patent is extended or adjusted under 35 U.S.C. 154(b) by 125 days.

(21) Appl. No.: 14/980,038

(22) Filed: Dec. 28, 2015

(65) Prior Publication Data

US 2016/0207589 A1    Jul. 21, 2016

(30) Foreign Application Priority Data

Jan. 15, 2015  (JP) ................................. 2015-005857

(51) Int. Cl.
*B62M 6/00* (2010.01)
*B62M 6/45* (2010.01)
*B62M 6/50* (2010.01)
*B62M 6/55* (2010.01)

(52) U.S. Cl.
CPC ................ *B62M 6/45* (2013.01); *B62M 6/50* (2013.01); *B62M 6/55* (2013.01)

(58) Field of Classification Search
None
See application file for complete search history.

(56) References Cited

U.S. PATENT DOCUMENTS

| 8,777,804 | B2 | 7/2014 | Takachi |
| 8,781,663 | B2 | 7/2014 | Watarai |
| 8,831,810 | B2 | 9/2014 | Shoge et al. |
| 2013/0054065 | A1 | 2/2013 | Komatsu |
| 2013/0054067 | A1* | 2/2013 | Shoge ...................... B62M 6/45 701/22 |

FOREIGN PATENT DOCUMENTS

JP        3717076 B2    11/2005

* cited by examiner

*Primary Examiner* — Rami Khatib
*Assistant Examiner* — Gerrad A Foster
(74) *Attorney, Agent, or Firm* — Global IP Counselors, LLP (57) ABSTRACT

A bicycle control apparatus is provided for controlling a bicycle assist device. The bicycle control apparatus includes a controller that is configured to control an assist motor for assisting a manual drive force of a transmission with a plurality of sprockets. The controller is configured to control an output of the assist motor based on a rotational position of a sprocket of the plurality of sprockets when the transmission performs a shifting operation to switch a chain between two of the plurality of sprockets.

20 Claims, 4 Drawing Sheets

BICYCLE CONTROL APPARATUS FOR BICYCLE ASSIST DEVICE AND BICYCLE ASSIST DEVICE

CROSS-REFERENCE TO RELATED APPLICATIONS

This application claims priority to Japanese Patent Application No. 2015-005857, filed on Jan. 15, 2015. The entire disclosure of Japanese Patent Application No. 2015-005857 is hereby incorporated herein by reference.

BACKGROUND

Field of the Invention

This invention generally relates to a bicycle control apparatus for a bicycle assist device and a bicycle assist device comprising the bicycle control apparatus.

Background Information

Some bicycles are provided with an assist motor to assist the rider in driving the bicycle. A bicycle control apparatus is often provided to control the assist motor. One example of a bicycle control apparatus for controlling a bicycle assist device is disclosed in Japanese Patent No. 3,717,076. In this patent, the bicycle control apparatus restricts the output of an assist motor when a bicycle transmission shifts gears, and then releases the restriction on the output of the assist motor based on a prescribed time having elapsed since the start of the restriction on the output of the assist motor.

SUMMARY

Generally, the present disclosure is directed to various features of a bicycle control apparatus. It has been found that the control apparatus disclosed in Japanese Patent No. 3,717,076 does not consider the riding conditions of the bicycle in terms of controlling of the output of the assist motor when shifting gears. Therefore, there is still room for improvement regarding the control of the output of the assist motor.

One object of the present invention is to provide a control apparatus for a bicycle assist device that is capable of appropriately controlling the output of the assist motor, as well as a bicycle assist device that comprises the control apparatus.

In view of the state of the known technology and in accordance with a first aspect of the present disclosure, a bicycle control apparatus is provided for controlling a bicycle assist device. The bicycle control apparatus comprises a controller that is configured to control an assist motor for assisting a manual drive force of a transmission with a plurality of sprockets. The controller is configured to control an output of the assist motor based on a rotational position of a sprocket of the plurality of sprockets when the transmission performs a shifting operation to switch a chain between two of the plurality of sprockets.

In accordance with a second aspect of the present invention, the bicycle control apparatus according to the first aspect is configured so that the controller is further configured to restrict the output of the assist motor based on the rotational position of the sprocket.

In accordance with a third aspect of the present invention, the bicycle control apparatus according to the second aspect is configured so that the controller is configured to release a restriction on the output of the assist motor after restricting the output of the assist motor based on the rotational position of the sprocket.

In accordance with a fourth aspect of the present invention, the bicycle control apparatus according to the second or third aspect is configured so that the controller is configured to restrict the output of the assist motor by one of stopping an operation of the assist motor and reducing the output of the assist motor to be lower than that prior to restricting the output of the assist motor.

In accordance with a fifth aspect of the present invention, the bicycle control apparatus according to any one of the second to fourth aspects is configured so that the controller is configured to releases a restriction on the output of the assist motor by one of returning a ratio of the output of the assist motor with respect to the manual drive force to substantially the same magnitude as that prior to restricting the output of the assist motor and increasing the ratio to be greater than that after restricting the output of the assist motor.

In accordance with a sixth aspect of the present invention, the bicycle control apparatus according to any one of the second to fifth aspects is configured so that the controller is configured to determine a magnitude of the output of the assist motor when restricting the output of the assist motor based on the output of the assist motor prior to restricting the output of the assist motor.

In accordance with a seventh aspect of the present invention, the bicycle control apparatus according to any one of the second to sixth aspects is configured so that the controller is configured to determine a magnitude of the output of the assist motor when restricting the output of the assist motor according to each of the plurality of sprockets.

In accordance with an eighth aspect of the present invention, the bicycle control apparatus according to any one of the first to seventh aspects further comprises a first sensor is configured to detect a rotational position of a shift region that is formed on the sprocket. The controller is configured to control the output of the assist motor based on a detection result of the first sensor.

In accordance with a ninth aspect of the present invention, the bicycle control apparatus according to the eighth aspect is configured so that the first sensor is configured to one of directly detect the rotational position of the shift region and indirectly detects the rotational position of the shift region by detecting a rotational position of a crankshaft that is coupled to the sprocket.

In accordance with a tenth aspect of the present invention, the bicycle control apparatus according to the ninth aspect is configured so that the controller is configured to restrict the output of the assist motor based on the fact that the controller is configured to restrict the output of the assist motor based on the rotational position of the shift region having changed from being outside of a prescribed range to being inside of the prescribed range.

In accordance with an eleventh aspect of the present invention, the bicycle control apparatus according to the tenth aspect is configured so that the controller is configured to releases a restriction on the output of the assist motor based on a determination that the shifting operation of the transmission has been completed.

In accordance with a twelfth aspect of the present invention, the bicycle control apparatus according to the tenth aspect is configured so that the controller is configured to release a restriction on the output of the assist motor based on the rotational position of the shift region having changed from being inside of a prescribed range to being outside of the prescribed range.

In accordance with a thirteenth aspect of the present invention, the bicycle control apparatus according to the tenth aspect is configured so that the prescribed range is determined along with a position to which the transmission pushes the chain out during a shifting operation.

In accordance with a fourteenth aspect of the present invention, the bicycle control apparatus according to any one of the first to thirteenth aspects is configured so that the controller is configured to control the output of the assist motor before the transmission starts a shifting operation.

In accordance with a fifteenth aspect of the present invention, the bicycle control apparatus according to any one of the first to fourteenth aspects is configured so that the controller is configured to restrict the output of the assist motor according to the operation of the transmission based on the rotational position of the sprocket.

In accordance with a sixteenth aspect of the present invention, the bicycle control apparatus according to the fifteenth aspect is configured so that the controller is configured to control the output of the assist motor based on a detection result of a second sensor for detecting an operation of a shift operation device for operating the transmission.

In accordance with a seventeenth aspect of the present invention, the bicycle control apparatus according to any one of the first to sixteenth aspects is configured so that the sprocket is a front sprocket, and the transmission is a front transmission.

In accordance with an eighteenth aspect of the present invention, the bicycle control apparatus according to the seventeenth aspect is configured so that the front sprocket is configured to rotate synchronously with a crankshaft.

In accordance with a nineteenth aspect of the present invention, the bicycle control apparatus according to the seventeenth aspect is configured so that the front sprocket is configured to rotate asynchronously with a crankshaft.

In accordance with a twentieth aspect of the present invention, the bicycle control apparatus according to any one of the first to nineteenth aspects is configured so that the assist motor is configured to provide a drive force to the sprocket.

In accordance with a twenty-first aspect of the present invention, a bicycle assist device comprises a bicycle control apparatus according to any one of the first to twentieth aspects further comprises the assist motor.

Also other objects, features, aspects and advantages of the disclosed bicycle control apparatus will become apparent to those skilled in the art from the following detailed description, which, taken in conjunction with the annexed drawings, discloses one embodiment of the bicycle control apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
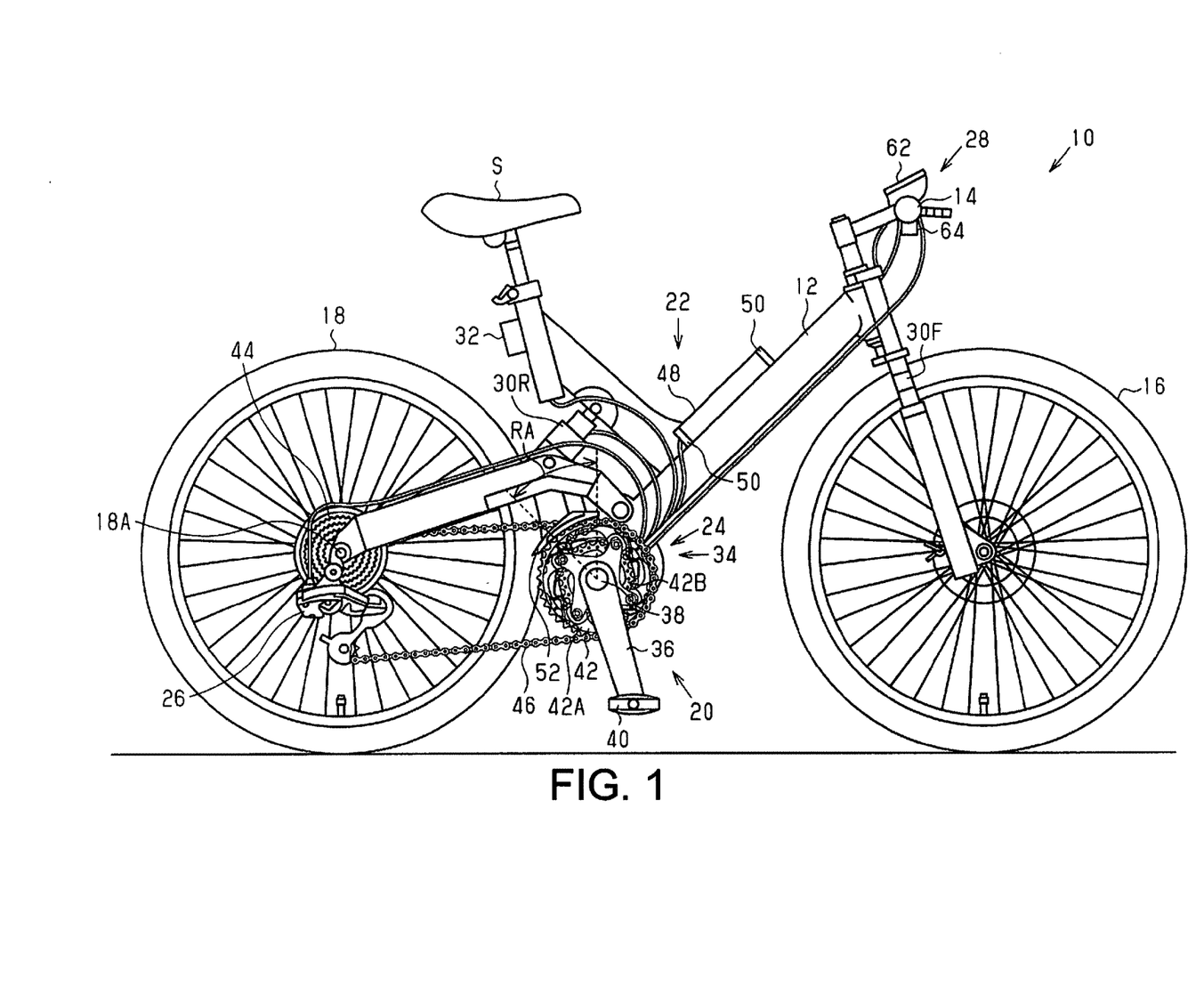
FIG. 1 is a side elevational view of a bicycle equipped with a bicycle assist device having a bicycle control apparatus in accordance with one illustrated embodiment.

Referring initially to FIG. 1, a bicycle 10 is illustrated that is configured in accordance with a first embodiment. The bicycle 10 basically comprises a frame 12, a handlebar 14, a front wheel 16, a rear wheel 18, a drive mechanism 20, a battery unit 22, a front transmission 24, a rear transmission 26, an operating device 28, a pair of suspension adjustment devices 30F and 30R, a seat adjustment device 32 and an assist device 34.

The drive mechanism 20 comprises a pair of crank arms 36, a crankshaft 38, a pair of pedals 40, a front sprocket assembly 42, a rear sprocket assembly 44 and a chain 46.

Figure 4:
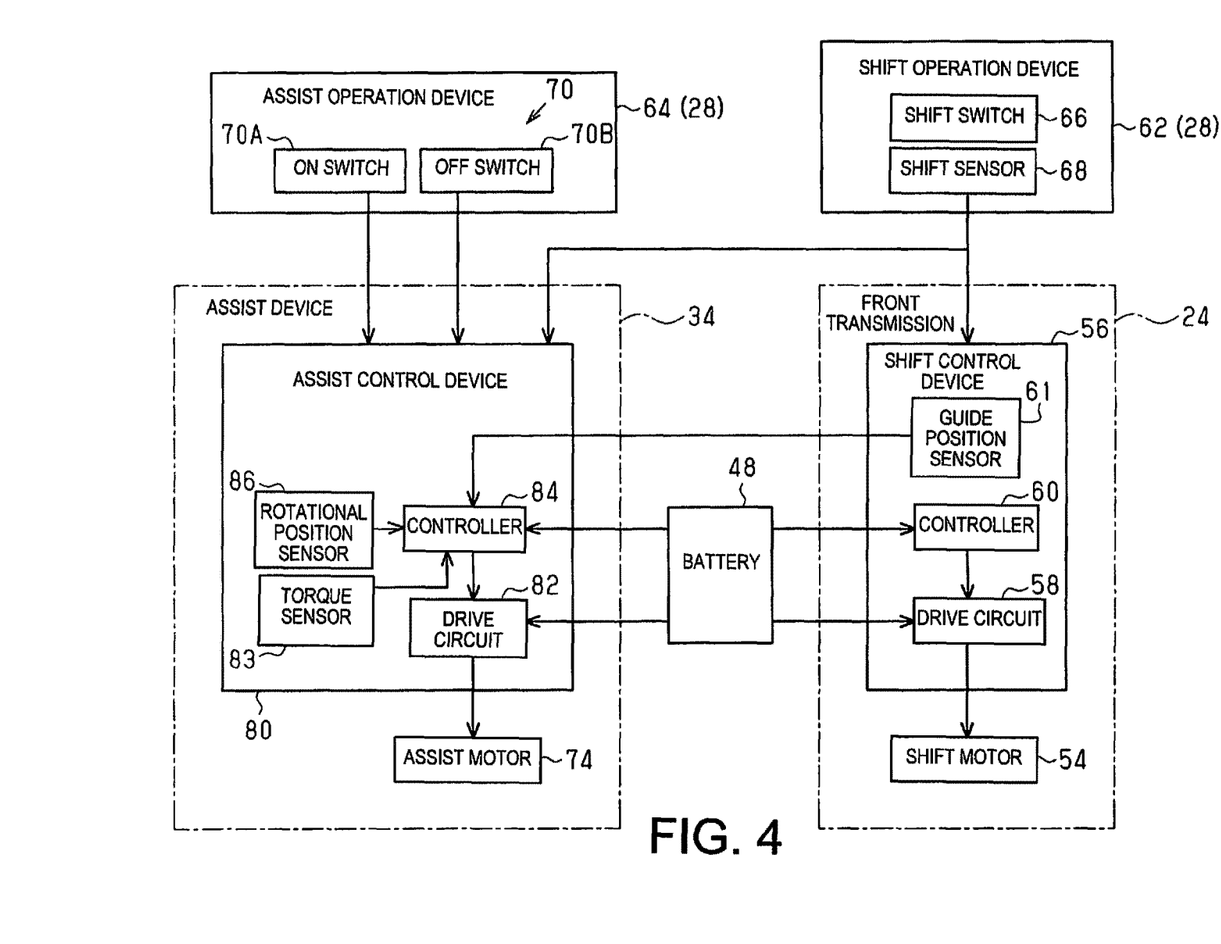
FIG. 4 is a simplified block diagram showing an overall electrical configuration of the bicycle in illustrated FIG. 1.

The crank arms 36 are rotatably attached to the frame 12 via one crankshaft 38. The crankshaft 38 is rotatably supported to the assist device 34. The assist device 34 is supported by the frame 12. The assist device 34 comprises an output unit that is coupled to the crankshaft 38. As seen in FIG. 4, a torque sensor 83 is provided on a power transmission path between the crankshaft 38 and the output unit for detecting the manual drive force. The output unit of the assist device 34 is formed in a tubular shape, and the crankshaft 38 and the output unit are provided coaxially. The crankshaft 38 and the output unit can be non-rotatably coupled, or they can be coupled via a one-way clutch between them so that when the crankshaft 38 rolls forward, the front sprocket assembly 42 also rolls forward. The pedals 40 are attached to the free ends the crank arms 36 so as to be rotatable around a pedal shaft.

The front sprocket assembly 42 is coupled to the output unit of the assist device 34. The front sprocket assembly 42 is provided coaxially with the crankshaft 38. The front sprocket assembly 42 is coupled so as not to rotate relative to the crankshaft 38. The front sprocket assembly 42 comprises a plurality of sprockets. In the present embodiment, the front sprocket assembly 42 comprises, for example, a first front sprocket 42A and a second front sprocket 42B.

The rear sprocket assembly 44 is rotatably attached around an axle 18A of the rear wheel 18. The rear sprocket assembly 44 is coupled with the rear wheel 18 via a one-way clutch (not shown). The rear sprocket assembly 44 comprises a plurality of sprockets. In the present embodiment, the rear sprocket assembly 44 comprises, for example, ten sprockets.

The chain 46 is wrapped onto one of the front sprockets 42A and 42B of the front sprocket 42 and one of the rear sprockets of the rear sprocket assembly 44. When the crank arm 36 rotates due to the manual drive force that is applied to the pedals 40, the rear wheel 18 is rotated by the front sprocket 42, the chain 46, and the rear sprocket assembly 44.

The battery unit 22 comprises a battery 48 and a holder 50 for detachably attaching the battery 48 to the frame 12. The battery 48 comprises one or a plurality of battery cells (not shown). The battery 48 is a rechargeable battery. The battery 48 supplies power to the suspension adjustment devices 30F and 30R, the seat adjustment device 32, a shift control device 56 (see FIG. 4), and an assist control device 80 (see FIG. 4).

The front transmission 24 and the rear transmission 26 are external-type transmissions.

The operating device 28 is attached to the handlebar 14.

The suspension adjustment device 30F adjusts at least one of the damping, the rebound, the hardness, and the height of the front suspension of the bicycle 10 steplessly or in a stepwise manner. The suspension adjustment device 30R adjusts at least one of the damping, the rebound, the hardness, and the height of the rear suspension of the bicycle 10 steplessly or in a stepwise manner. Power is supplied to the suspension adjustment devices 30F and 30R from the battery 48. The operating device 28 comprises an operating member for operating the suspension adjustment devices 30F and 30R. The suspension adjustment devices 30F and 30R operate in response to an operation of the operating device 28. The operating member is realized by, for example, a switch.

The seat adjustment device 32 adjusts the height of a saddle S of the bicycle 10 steplessly or in a stepwise manner. Power is supplied to the seat adjustment device 32 from the battery 48. The seat adjustment device 32 comprises a telescoping mechanism for extending and retracting the seatpost. The telescoping mechanism can extend and retract the seatpost with a motor, or this mechanism can be configured to extend and retract the seatpost hydraulically or pneumatically. In the case of employing a configuration in which the seatpost is extended and retracted hydraulically or pneumatically, the seat adjustment device 32 controls only the valve while the height of the saddle S is adjusted by the rider. The operating device 28 comprises an operating unit for operating the seat adjustment device 32. The seat adjustment device 32 operates in response to an operation of the operating device 28. The operating unit is realized by, for example, a switch.

Figure 2:
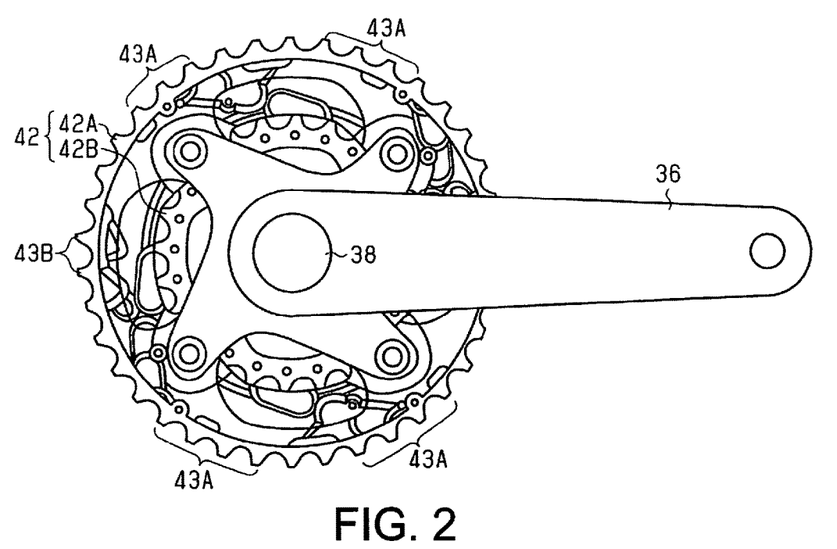
FIG. 2 is an outside elevational view of a front crank assembly with a pair of front sprockets used in the bicycle illustrated in FIG. 1.
Figure 3:
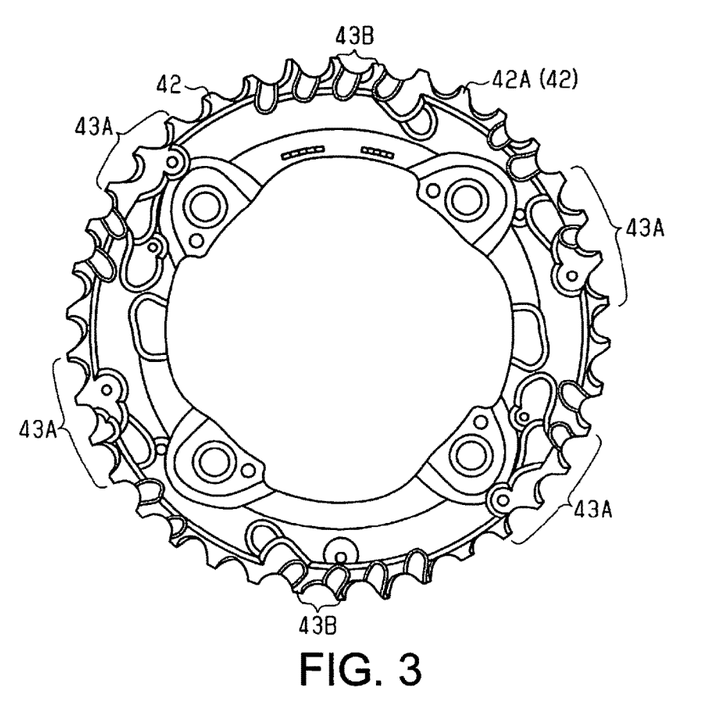
FIG. 3 is an inside elevational view of a first front sprocket of the front crank assembly illustrated in FIG. 2.

The configuration of the front sprocket assembly 42 is explained with reference to FIGS. 2 and 3.

Each of the first front sprocket 42A and the second front sprocket 42B have a plurality of teeth that are circumferentially arranged around the peripheral edge of the first front sprocket 42A and the second front sprocket 42B. The first front sprocket 42A is larger in diameter than the second front sprocket 42B. The first front sprocket 42A and the second front sprocket 42B have a different number of teeth. The first front sprocket 42A has a plurality of shift regions formed by the teeth. In particular, the first front sprocket 42A comprises at least one first shift region 43A and at least one second shift region 43B. As an example, four first shift regions 43A and two second shift regions 43B are formed on the first front sprocket 42A.

The first shift region 43A is utilized for a shifting operation (an upshift operation) in which the chain 46 (see FIG. 1) is switched from the second front sprocket 42B to the first front sprocket 42A by a chain guide 52 (see FIG. 1) of the front transmission 24. At least either a recess or a projection for guiding the chain 46 to the teeth of the first front sprocket 42A is formed in the first shift region 43A.

The second shift region 43B is utilized for a shifting operation (a downshift operation) in which the chain 46 (see FIG. 1) is switched from the first front sprocket 42A to the second front sprocket 42B by a chain guide 52 (see FIG. 1) of the front transmission 24.

In an upshift operation, the chain 46 is switched when one shift region 43A from among the four shift regions 43A passes a shifting range RA (see FIG. 1) of the front sprocket assembly 42. The shifting range RA is a range including a position at which the chain guide 52 pushes the chain 46 out (see FIG. 1) and corresponds to the "prescribed range". The shifting range RA is determined, along with the position to which the front transmission 24 (see FIG. 1) pushes the chain 46 out, when shifting gears.

On the other hand, in a downshift operation, the chain 46 is switched when one shift region 43B from among the two shift regions 43B passes the shifting range RA.

The electrical configuration of the bicycle 10 will be explained with reference to FIG. 4.

The front transmission 24 comprises a gear shift motor 54 (see FIG. 1) and a shift control device 56. As seen in FIG. 1, the gear shift motor 54 is configured to drive the chain guide 52. The shift control device 56 is configured to control the output of the gear shift motor 54.

The shift control device 56 comprises a drive circuit 58, a controller 60 and a guide position sensor 61. The drive circuit 58 is connected to the gear shift motor 54. The controller 60 is configured to control the power supplied to the drive circuit 58. The guide position sensor 61 is configured to detect detecting the position of the chain guide 52.

The operating device 28 comprises a shift operation device 62 and an assist operation device 64.

The shift operation device 62 comprises a shift switch 66 and a shift sensor 68. The shift sensor 68 outputs a shift request signal to the shift control device 56 and an assist control device 80 of the assist device 34, based on the fact that the shift switch 66 has been operated. The shift switch 66 comprises a first shift switch for upshifting and a second shift switch for downshifting (both not shown). The shift switch 66 can be a push-button switch or a lever-type switch.

The assist operation device 64 comprises an assist switch 70. The assist switch 70 comprises an ON switch 70A and an OFF switch 70B. The ON switch 70A outputs an assist request signal to the assist control device 80 when operated. The OFF switch 70B outputs an assist stop signal to the assist control device 80 when operated. The assist switch 70 can also be configured to selectively output an assist request signal or an assist stop signal via the operation of one switch.

The assist device 34 is electrically connected to the shift operation device 62 and the assist operation device 64. The assist device 34 comprises an assist motor 74 and an assist control device 80. The assist motor 74 is configured to assist the manual drive force that rotates the front sprocket assembly 42 (see FIG. 1). The assist control device 80 is configured to control the output of the assist motor 74. The assist motor 74 is coupled to a power transmission path between the crankshaft 38 and the front sprocket assembly 42 (see FIG. 1) via a one-way clutch and a reduction gear. Thus, the assist motor 74 provides a drive force to the front sprocket assembly 42.

The assist control device 80 comprises a drive circuit 82, a torque sensor 83 and a controller 84. The drive circuit 82 is connected to the assist motor 74. The torque sensor 83 is configured to detect the manual drive force. The controller 84 is configured to control the power that is supplied to the drive circuit 82. Additionally, the assist control device 80 comprises a rotational position sensor 86 for detecting the rotational position of the shift regions 43A and 43B of the front sprocket assembly 42 (see FIG. 3) with respect to the front transmission 24.

When an assist request signal has been received by the assist operation device 64, the controller 84 drives the assist motor 74 based on the detection result of the torque sensor 83. The controller 84 stops the assist motor 74 based on the fact that an assist stop signal has been received by the assist operation device 64.

In the case that a one-way clutch is present on the power transmission path between the crankshaft 38 and the front sprocket assembly 42, the rotational position sensor 86 detects the rotational positions of the shift regions 43A and 43B (see FIG. 3) by detecting the rotational position of the front sprocket assembly 42. In the case that a one-way clutch is not present on the power transmission path between the crankshaft 38 and the front sprocket assembly 42, the rotational position sensor 86 detects the rotational positions of the shift regions 43A and 43B by detecting the rotational position of at least one the crankshaft 38 and the front sprocket assembly 42. The rotational position sensor 86 comprises a reference position sensor for detecting the reference position of the front sprocket assembly 42, as well as a relative rotational position sensor for detecting the rotational position from the reference position. The reference position sensor comprises, for example, a reed switch that detects a magnet that is provided at the reference position of the front sprocket assembly 42. The relative rotational position sensor is attached to the front sprocket assembly 42 or the crankshaft 38, and this sensor detects a magnetic field of a multi-pole ring magnet comprising portions with alternately different polarities in the circumferential direction.

The controller 84 executes a motor output control for controlling the output of the assist motor 74 based on the rotational position of the front sprocket assembly 42 when the front transmission 24 performs an upshift operation or a downshift operation.

Figure 5:
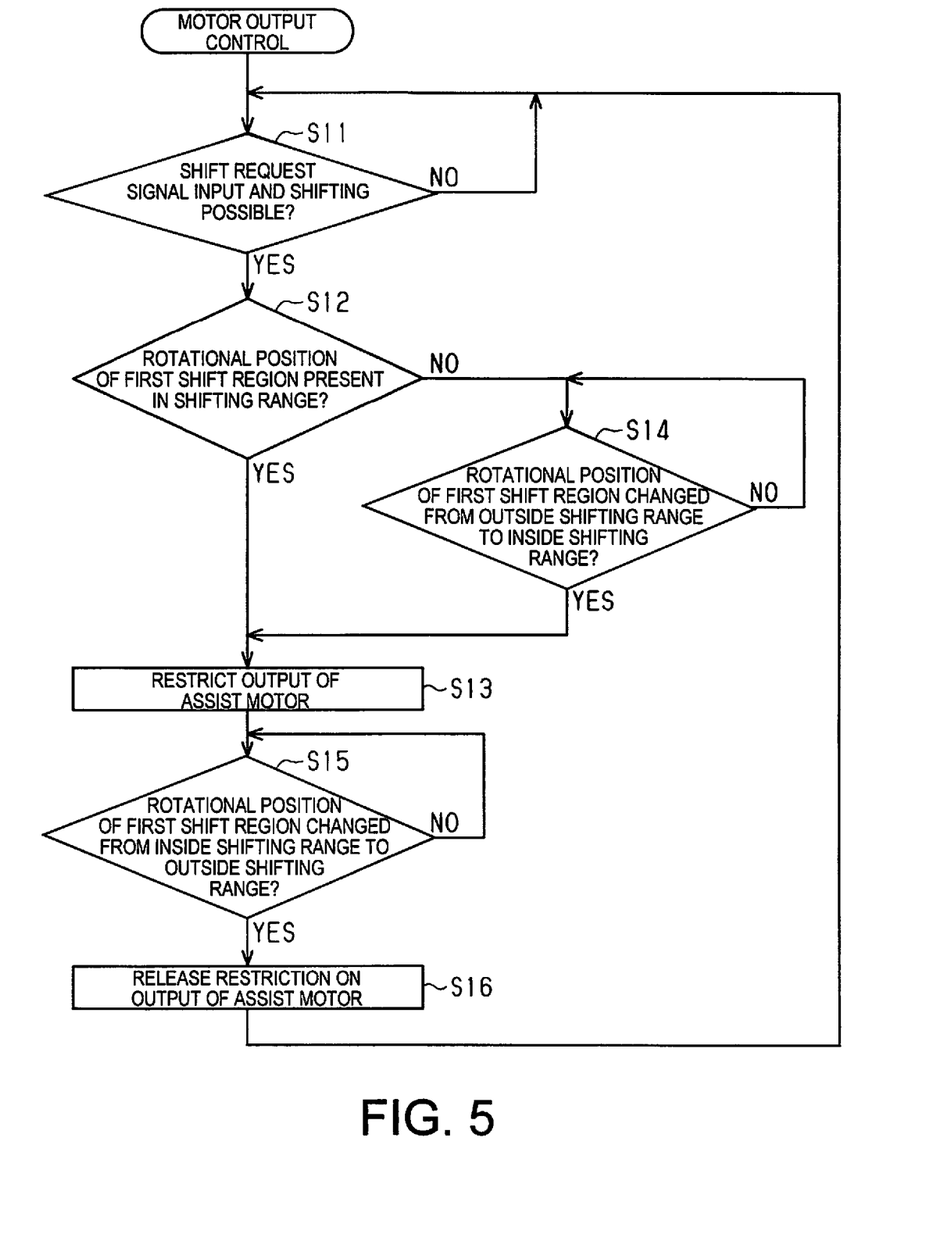
FIG. 5 is a flowchart showing one example of a control operation of the motor output control that is executed by the controller of the assist device in Figure I.

One example of a procedure of the motor output control will be explained with reference to FIG. 5. In the present embodiment, a case in which the front transmission 24 performs an upshift operation will be explained. The present control is also executed, based on the same idea, when the front transmission 24 performs a downshift operation.

The controller 84 starts the present control based on the fact that an assist request signal has been received by the assist operation device 64. The controller 84 ends the present control based on the fact that an assist stop signal has been received by the assist operation device 64. The controller 84 includes at least one processor and at least one a memory device with a predetermined software program stored therein for controlling the assist motor 42.

In step S11, the controller 84 determines whether or not a shift request signal has been received by the shift sensor 68 and whether shifting is possible. The controller 84 advances the operation to step S12 when a shift request signal has been received by the shift sensor 68 and a determination has been made that shifting is possible. The controller 84 does not advance the operation to the next step even if a shift request signal has been received and executes the operation of step S11 again when a determination has been made that the chain 46 is on the first front sprocket 42A, based on the detection result of the guide position sensor 61. In the case of a downshift operation, in step S11, the controller 84 does not advance the operation to the next step even if a shift request signal has been received and executes the operation of step S11 again when a determination has been made that the chain 46 is on the second front sprocket 42B, based on the detection result of the guide position sensor 61.

In step S12, the controller 84 determines whether or not the rotational position of one first shift region 43A of the first front sprocket 42A is present in the shifting range RA, based on the detection result of the rotational position sensor 86.

The controller 84 advances the operation to step S13 when a determination has been made that the rotational position of one first shift region 43A of the first front sprocket 42A is present in the shifting range RA. In the case of a downshift operation, the controller 84 determines whether or not the rotational position of one second shift region 43B (see FIG. 3) of the first front sprocket 42A is present in the shifting range RA in step S12.

In step S13, the controller 84 restricts the assisting force by reducing the output of the assist motor 74. The controller 84 determines the magnitude of the output of the assist motor 74 when restricting the output of the assist motor 74 based on the output of the assist motor 74 prior to restricting the output of the assist motor 74. For example, the controller 84 increases the reduction amount of the output of the assist motor 74 as the output of the assist motor 74 increases prior to restricting the output of the assist motor 74.

On the other hand, the controller 84 advances the operation to step S14 when a determination has been made that the rotational position of one first shift region 43A of the first front sprocket 42A is not present in the shifting range RA in step S12. In the case of a downshift operation, the controller 84 advances the operation to step S14 when a determination has been made that the rotational position of one second shift region 43B of the first front sprocket 42A is not present in the shifting range RA in step S12.

In step S14, the controller 84 determines whether or not the rotational position of one first shift region 43A of the first front sprocket 42A has changed from being outside of the shifting range RA to being inside of the shifting range RA, based on the detection result of the rotational position sensor 86. The controller 84 advances the operation to step S13 when a determination has been made that the rotational position of one first shift region 43A of the first front sprocket 42A has changed from being outside of the shifting range RA to being inside of the shifting range RA. In the case of a downshift operation, the controller 84 determines whether or not the rotational position of one second shift region 43B of the first front sprocket 42A has changed from being outside of the shifting range RA to being inside of the shifting range RA.

In step S15, the controller 84 determines whether or not the rotational position of one first shift region 43A of the first front sprocket 42A has changed from being inside of the shifting range RA to being outside of the shifting range RA, based on the detection result of the rotational position sensor 86. The controller 84 advances the operation to step S16 when a determination has been made that the rotational position of one first shift region 43A of the first front sprocket 42A has changed from being inside of the shifting range RA to being outside of the shifting range RA. In the case of a downshift operation, the controller 84 determines whether or not the rotational position of one second shift region 43B of the first front sprocket 42A has changed from being inside of the shifting range RA to being outside of the shifting range RA.

The controller 84 releases the restriction on the output of the assist motor 74 in step S16. For example, the controller 84 releases the restriction on the output of the assist motor 74 by returning the ratio of the output of the assist motor 74 with respect to the manual drive force to being substantially the same magnitude as that prior to restricting the output of the assist motor 74; then, the operation proceeds to step S11.

The action and effects of the assist control device 80 will now be described.

The controller 84 of the assist control device 80 restricts the output of the assist motor 74, based on the rotational position of the first front sprocket assembly 42, when a shift request signal has been received, in other words, when the front transmission 24 performs a shifting operation. Additionally, after restricting the output of the assist motor 74, the controller 84 releases the restriction on the output of the assist motor 74 based on the rotational position of the front sprocket assembly 42. In this way, the controller 84 controls the output of the assist motor 74 based on the rotational position of the first front sprocket assembly 42, which is one example of a riding condition of the bicycle 10; therefore, more appropriately controlling the output of the assist motor 74 is possible.

The assist control device 80 further exerts the following effects.

(1) When the front transmission 24 performs a shifting operation, the controller 84 restricts the output of the assist motor 74 based on the rotational position of the front sprocket assembly 42; therefore, more appropriately setting the timing at which the restriction on the output of the assist motor 74 will be started is possible.

(2) When the front transmission 24 performs a shifting operation, the controller 84 releases the restriction on the output of the assist motor 74 based on the rotational position of the front sprocket assembly 42; therefore, more appropriately setting the timing at which the restriction on the output of the assist motor 74 will be released is possible. For this reason, immediately restarting the assist after the shifting operation has been completed is possible.

(3) The controller 84 restricts the output of the assist motor 74 by reducing the output of the assist motor 74 to be lower than that prior to restricting the output of the assist motor 74 when the front transmission 24 performs a shifting operation. The tensile force that acts on the chain 46 when the chain guide 52 of the front transmission 24 switches the chain 46 is thereby reduced. For this reason, the chain 46 can be easily and appropriately switched between two of the front sprockets 42A and 42B of the front sprocket assembly 42.

(4) The controller 84 releases the restriction on the output of the assist motor 74 by returning the ratio of the output of the assist motor 74 with respect to the manual drive force to be substantially the same magnitude as that prior to restricting the output of the assist motor 74. For this reason, the assisting force is unlikely to greatly change before and after the shifting operation, making stable traveling possible.

(5) The controller 84 determines the magnitude of the output of the assist motor 74 when restricting the output of the assist motor 74 based on the output of the assist motor 74 prior to restricting the output of the assist motor 74. For this reason, more appropriately reducing the output of the assist motor 74, as compared to a case in which the output of the assist motor 74 is always reduced at a constant magnitude, is possible when the front transmission 24 performs a shifting operation.

(6) The rotational position sensor 86 directly detects the rotational positions of the first shift region 43A and the second shift region 43B; therefore, the precision for detecting the rotational position of the front sprocket assembly 42 is increased. For this reason, more appropriately controlling the output of the assist motor 74 is possible.

(7) The controller 84 controls the output of the assist motor 74 based on the fact that the rotational position of one of the first shift region 43A has changed from being outside of the shifting range RA to being inside of the shifting range RA. For this reason, for example, as compared to a case in which the output of the assist motor 74 is restricted based on the fact that a shift request signal has been received by the shift sensor 68, delaying the timing at which the restriction on the output of the assist motor 74 is started is possible.

(8) For example, when restricting the output of the assist motor 74 for a prescribed time based on the fact that a shift request signal has been received, a time that is sufficient for the front transmission 24 to complete an upshift operation or a downshift operation is set as the prescribed time. For this reason, the prescribed time that is set, that is, the time that the output of the assist motor 74 is restricted, tends to become long. On the other hand, the controller 84 releases the restriction on the output of the assist motor 74 based on the fact that the rotational position of one first shift region 43A has changed from being inside of the shifting range RA to being outside of the shifting range RA. In this way, the controller 84 releases the restriction on the output of the assist motor 74 based on the rotational position of the first front sprocket 42A; therefore, the time during which the output of the assist motor 74 is restricted will likely not become long.

The descriptions relating to the above-described embodiments are examples of the forms that the assist device according to the present invention and the control apparatus thereof can take, and they are not intended to limit the forms thereof. The assist device according to the present invention and the control apparatus thereof may, in addition to the embodiments, take the form of the modified examples of the embodiments described below, as well as forms that combine at least two modified examples that are not mutually contradictory.

The controller 84 of a modified example stops the operation of the assist motor 74 in step S13 of the motor output control.

The controller 84 of a modified example releases the restriction on the output of the assist motor 74 by increasing the ratio of the output of the assist motor 74 with respect to the manual drive force to be greater than that after restricting the output of the assist motor 74 in step S16 of the motor output control.

The drive mechanism 20 of a modified example comprises three or more front sprockets 42 that each has a different number of teeth. The controller 84 that is mounted to the bicycle 10 comprising the drive mechanism 20 of this modified example determines the magnitude of the output of the assist motor 74 when restricting the output of the assist motor 74 according to each of the plurality of shift stages, that is, the plurality of front sprockets, in step S13 of the motor output control. That is, the magnitude of the output of the assist motor 74 when restricting the output of the assist motor 74 is differentiated according to each front sprocket of this modified example. For example, the controller 84 of this modified example increases the reduction amount of the output of the assist motor 74 when restricting the output of the assist motor 74 more prior to the shifting operation as the number of teeth of the front sprocket increases.

The rotational position sensor 86 of a modified example is mounted to a bicycle 10 that is configured so that the front sprocket assembly 42 rotates synchronously with the crankshaft 38. The rotational position sensor 86 of this modified example directly detects the rotational positions of the first shift region 43A and the second shift region 43B by detecting the rotational position of the crankshaft 38 that is coupled to the front sprocket assembly 42.

The controller 84 that is mounted to a bicycle 10 comprising a front transmission 24 of a modified example determines whether or not a shifting operation of the front transmission 24 has been completed based on the detection result of the guide position sensor 61 in step S15 of the motor output control. The controller 84 of this modified example advances the operation to step S16 based on the fact that the shifting operation of the front transmission 24 has been completed.

The controller 84 of a modified example determines whether or not a prescribed time has elapsed since reducing the output of the assist motor 74 in step S15 of the motor output control. The controller 84 of this modified example advances the operation to step S16 when a determination is made that a prescribed time has elapsed since reducing the output of the assist motor 74. The prescribed time is set in advance by experiment as sufficient time for the shifting operation to be completed.

The first front sprocket 42A of a modified example comprises one to three or five or more first shift regions 43A in arbitrary positions along the circumferential direction.

The first front sprocket 42A of a modified example comprises only one or a plurality of the first shift regions 43A in arbitrary positions along the circumferential direction.

The first front sprocket 42A of a modified example comprises one, three, or more of the second shift regions 43B in arbitrary positions along the circumferential direction.

The first front sprocket 42A of a modified example comprises only one or a plurality of the second shift regions 43B in arbitrary positions along the circumferential direction.

In the rear sprocket assembly 44 of a modified example, at least either a first shift region or a second shift region is formed on each sprocket, except for the rear sprocket that has the least number of teeth. The controller 84 that is mounted to a bicycle 10 comprising the rear sprocket assembly 44 of this modified example executes a motor output control during a shifting operation of the rear transmission 26 according to the same concept as that used in the shifting operation of the front transmission 24.

When a determination is made that a plurality of first shift regions 43A have passed the shifting range RA in step S15, the controller 84 of a modified example advances the operation to step S16. For example, the controller 84 determines that two first shift regions 43A have passed the shifting range RA in step S15. For example, there are cases in which the first shift regions 43A that are adjacent in the circumferential direction are formed in shapes that differ depending on the phase of the chain 46. In this case, in step S15, improving the precision of the shifting operation by determining that at least two first shift regions 43A have passed the shifting range RA is possible.

When the operation of step S12 is omitted and the determination in step S11 is YES, the controller 84 of a modified example advances the operation to step S14. When the first shift region 43A passes the shifting range RA, reducing the output of the assist motor 74 in substantially the entire first shift region 43A thereby becomes possible. The prescribed range may also be set to be a range that is larger than the shifting range RA. The prescribed range includes the shifting range RA and a first angle range that is set in advance in a direction in which the front sprocket assembly 42 reverses from the shifting range RA. The first angle range is selected from a range of, for example, 10°-30°. When the first shift region 43A passes the shifting range RA, reducing the output of the assist motor 74 in the entire first shift region 43A thereby becomes possible.

The bicycle 10 of a modified example comprises a mechanical transmission, a shifter, and a shifter detection sensor.

The mechanical transmission is a front transmission, in which a pantograph is operated according to the winding amount of a shift cable that switches the chain 46 between the front sprockets 42A and 42B. The shifter is, for example, attached to the handlebar 14 and winds the shift cable via an operation made by a rider. The shifter detection sensor detects that the shifter has been operated by the rider. The shifter detection sensor outputs a shifter operation signal to the controller 84 when the detection results indicate that the shifter has been operated by the rider.

The controller 84 that is mounted to the bicycle 10 of this modified example controls the output of the assist motor 74 based on the fact that a shifter operation signal has been received. For example, the controller 84 of this modified example restricts the output of the assist motor 74 before the front transmission 24 starts a shifting operation and executes step S15, as well as the subsequent operations, based on the fact that a shifter operation signal has been received.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle control apparatus for a bicycle assist device comprising:
   a controller configured to control an assist motor for assisting a manual drive force of a transmission with a plurality of sprockets; and
   a first sensor configured to detect a rotational position of a shift region that is formed on a sprocket among the plurality of sprockets,
   the controller being configured to receive a detection result from a second sensor, the second sensor being arranged to detect whether an operation of a shift operation device for operating the transmission has been performed,
   the controller being configured to control an output of the assist motor when the rotational position of the shift region is in a prescribed shifting range and the detection result of the second sensor indicates that the operation of the shift operation device has been performed to execute a shifting operation of the transmission.

2. The bicycle control apparatus as recited in claim 1, wherein
   the controller is further configured to restrict the output of the assist motor when the rotational position of the shift region is in the prescribed shifting range and the detection result of the second sensor indicates that the operation of the shift operation device has been performed.

3. The bicycle control apparatus as recited in claim 2, wherein the controller is configured to release the restriction on the output of the assist motor after restricting the output of the assist motor.

4. The bicycle control apparatus as recited in claim 2, wherein
the controller is configured to restrict the output of the assist motor by one of stopping an operation of the assist motor and reducing the output of the assist motor to be lower than that prior to restricting the output of the assist motor.

5. The bicycle control apparatus as recited in claim 2, wherein
the controller is configured to release the restriction on the output of the assist motor after restricting the output of the assist motor by executing one of
returning a ratio of the output of the assist motor with respect to the manual drive force to the same magnitude as that prior to restricting the output of the assist motor and
increasing the ratio.

6. The bicycle control apparatus as recited in claim 2, wherein
the controller is configured to determine a magnitude of the restricted output of the assist in accordance with the output of the assist motor prior to restricting the output of the assist motor.

7. The bicycle control apparatus as recited in claim 2, wherein
the controller is configured to determine a magnitude of the restricted output of the assist motor when restricting the output of the assist motor according to at least the sprocket among the plurality of sprockets.

8. The bicycle control apparatus as recited in claim 1, wherein
the first sensor is configured to one of directly detect the rotational position of the shift region and indirectly detect the rotational position of the shift region by detecting a rotational position of a crankshaft that is coupled to the sprocket.

9. The bicycle control apparatus as recited in claim 8, wherein
the controller is configured to restrict the output of the assist motor when the rotational position of the shift region has changed from being outside of the prescribed range to being inside of the prescribed range.

10. The bicycle control apparatus as recited in claim 9, wherein
the controller is configured to releases a restriction on the output of the assist motor based on a determination that the shifting operation of the transmission has been completed.

11. The bicycle control apparatus as recited in claim 9, wherein
the controller is configured to release a restriction on the output of the assist motor based on the rotational position of the shift region having changed from being inside of the prescribed range to being outside of the prescribed range.

12. The bicycle control apparatus as recited in claim 9, wherein
the prescribed range is determined based on a position to which the transmission pushes the chain out during the shifting operation.

13. The bicycle control apparatus as recited in claim 1, wherein
the controller is configured to control the output of the assist motor before the transmission starts a shifting operation.

14. The bicycle control apparatus as recited in claim 1, wherein
the controller is configured to restrict the output of the assist motor according to the operation of the transmission when the rotational position of the shift region is in the prescribed shifting range and the detection result of the second sensor indicates that the operation of the shift operation device has been performed.

15. The bicycle control apparatus as recited in claim 1, wherein
the sprocket is a front sprocket, and
the transmission is a front transmission.

16. The bicycle control apparatus as recited in claim 15, wherein
the front sprocket is configured to rotate synchronously with a crankshaft.

17. The bicycle control apparatus as recited in claim 1, wherein
the assist motor is configured to provide a drive force to the sprocket.

18. A bicycle assist device comprising the bicycle control apparatus as recited in claim 1, and further comprising the assist motor.

19. A bicycle control apparatus for a bicycle assist device comprising:
a controller configured to control an assist motor for assisting a manual drive force of a front transmission with a plurality of front sprockets, and
the controller being configured to control an output of the assist motor based on a rotational position of a front sprocket of the plurality of front sprockets when the front transmission performs a shifting operation to switch a chain between two of the plurality of front sprockets,
the front sprocket being configured to rotate asynchronously with a crankshaft.

20. A bicycle control apparatus fora bicycle assist device comprising:
a controller configured to control an assist motor for assisting a manual drive force of a front transmission having a plurality of front sprockets; and
a one-way clutch arranged on a power transmission path between a crankshaft and the plurality of front sprockets,
the controller being configured to control an output of the assist motor based on a rotational position of a front sprocket of the plurality of front sprockets when the front transmission performs a shifting operation to switch a chain between two of the plurality of front sprockets.

* * * * *